(12) United States Patent
Lubking et al.

(10) Patent No.: US 8,108,275 B2
(45) Date of Patent: Jan. 31, 2012

(54) METHOD AND SYSTEM FOR OFFERING FINANCIAL PRODUCTS BASED ON A CUSTOMER'S DETERMINED LIFE STATUS

(75) Inventors: Colleen C. Lubking, Richmond, VA (US); John N. Henneberger, Glen Allen, VA (US); Frederick Joel Mason, Jr., Richmond, VA (US); George W. Paslaski, Jr., Richmond, VA (US); Sharada Muthusubramanian, Glen Allen, VA (US); Brian Donohue, Glen Allen, VA (US)

(73) Assignee: Capital One Financial Corporation, McLean, VA (US)

( * ) Notice: Subject to any disclaimer, the term of this patent is extended or adjusted under 35 U.S.C. 154(b) by 3403 days.

(21) Appl. No.: 09/882,304

(22) Filed: Jun. 18, 2001

(65) Prior Publication Data

US 2003/0046208 A1 Mar. 6, 2003

(51) Int. Cl.
*G06Q 40/00* (2006.01)

(52) U.S. Cl. ........................................ 705/35; 705/36 R

(58) Field of Classification Search .................. None
See application file for complete search history.

(56) References Cited

U.S. PATENT DOCUMENTS

| | | | | |
|---|---|---|---|---|
| 5,852,811 | A | * | 12/1998 | Atkins ........................ 705/36 R |
| 6,055,573 | A | * | 4/2000 | Gardenswartz et al. ...... 709/224 |
| 6,430,542 | B1 | * | 8/2002 | Moran ........................ 705/36 R |
| 2002/0023051 | A1 | * | 2/2002 | Kunzle et al. .................. 705/38 |
| 2003/0093414 | A1 | * | 5/2003 | Litzow et al. .................... 707/3 |
| 2003/0144936 | A1 | * | 7/2003 | Sloan et al. ..................... 705/36 |

* cited by examiner

*Primary Examiner* — Elda Milef
(74) *Attorney, Agent, or Firm* — Finnegan, Henderson, Farabow, Garett & Dunner, LLP

(57) ABSTRACT

A system and method to provide financial products throughout the life of a customer. The present invention determines the life status of a customer. The life status is determined by analyzing the customer information from a variety of sources. This information is filtered or inputted into an algorithmic model to identify appropriate financial products to offer to the customer. In addition, the customer's creditworthiness is used to determine or optimize the financial product offered to the customer.

8 Claims, 6 Drawing Sheets

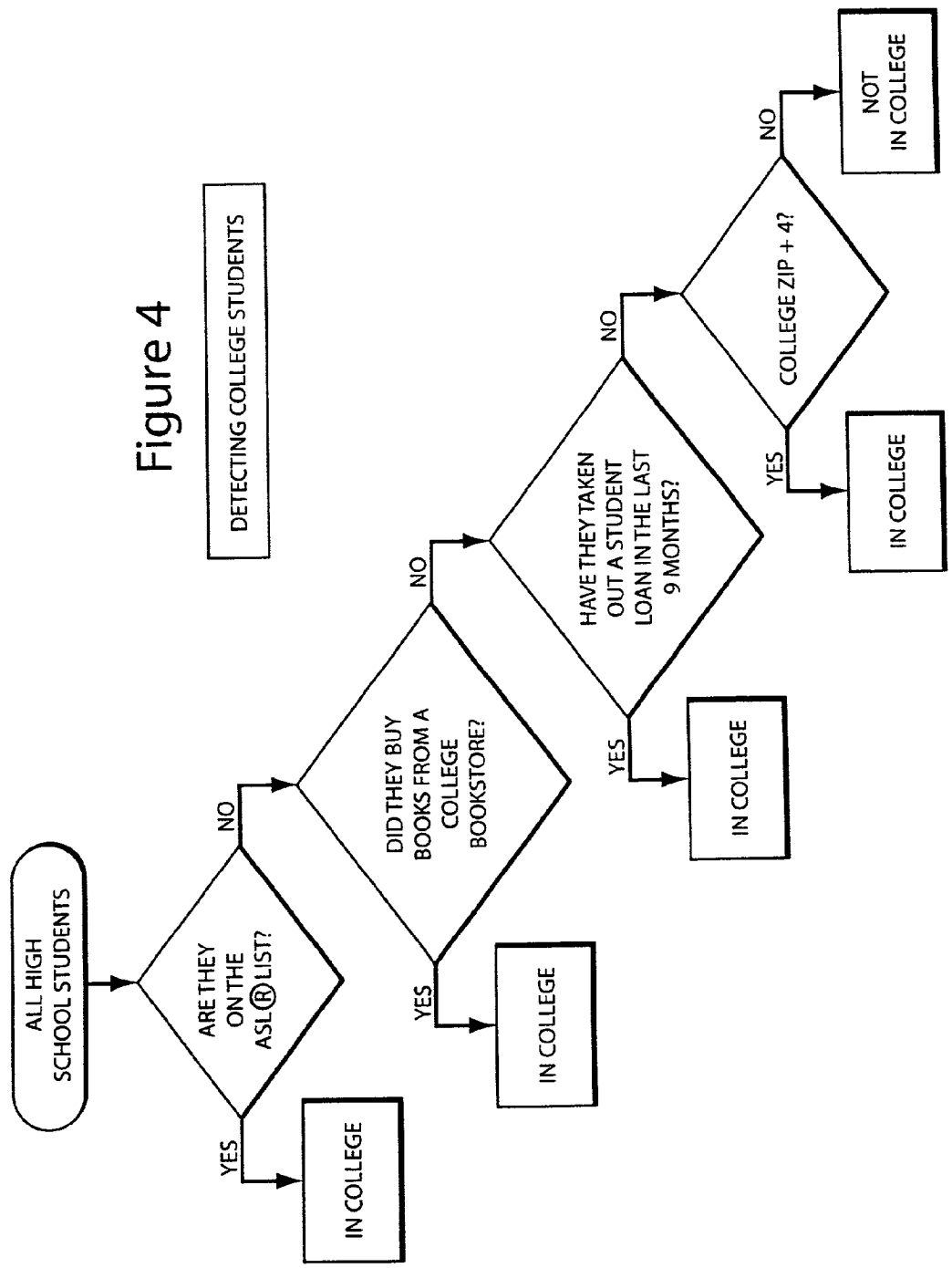

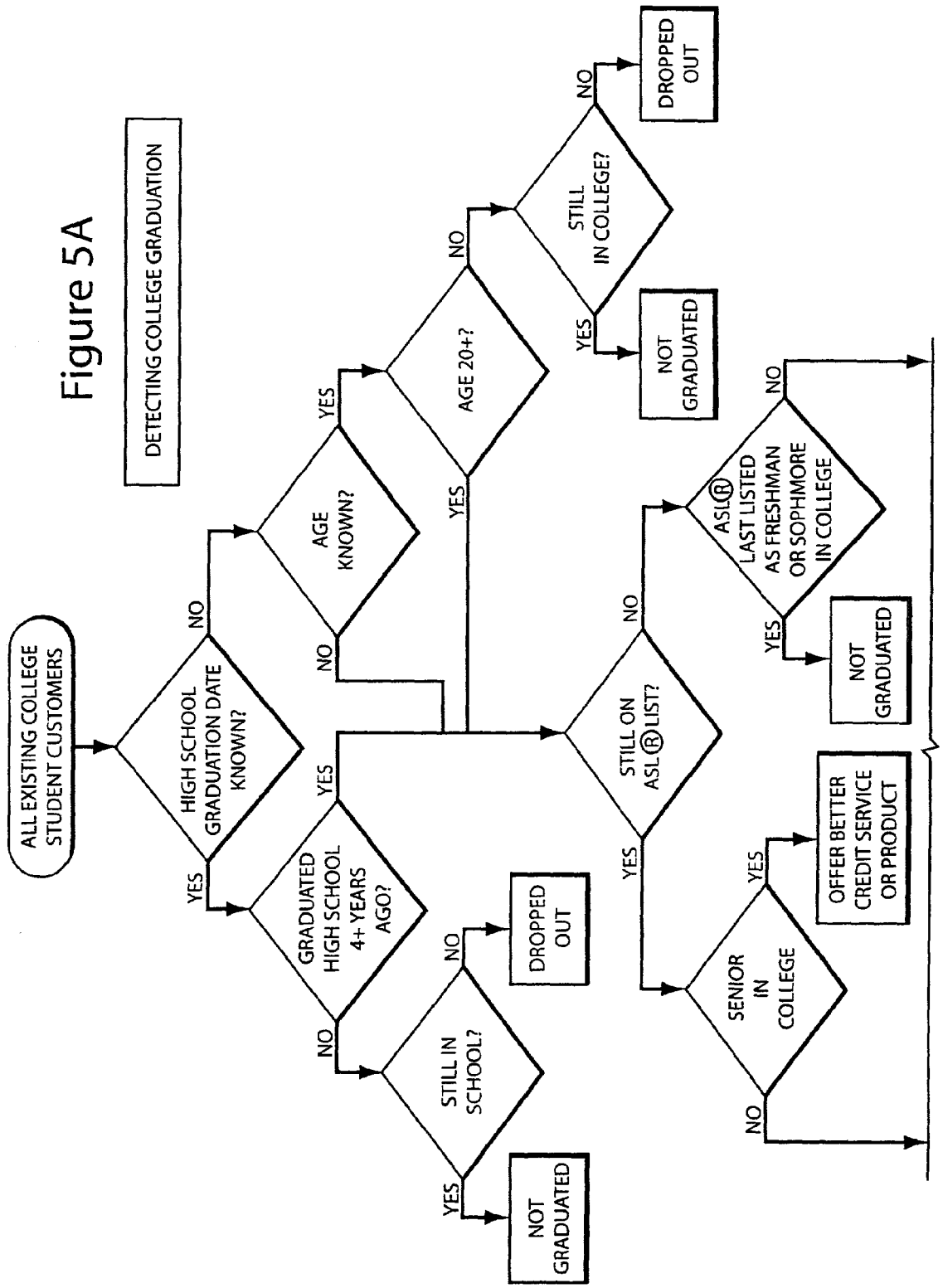

METHOD AND SYSTEM FOR OFFERING FINANCIAL PRODUCTS BASED ON A CUSTOMER'S DETERMINED LIFE STATUS

FIELD OF THE INVENTION

The present invention is related to financial products such as credit services and credit card products and to methods and systems for providing such services and products. More particularly, the invention relates to methods and systems that offer different financial products depending on a customer's determined life status.

BACKGROUND OF THE INVENTION

Lending institutions offer a variety of financial products. The term financial products refers to any type of financial products and services including but not limited to consumer credit services and corresponding credit card products, and banking/investment services. These financial products are directed toward consumers that require financial assistance with student loans, purchasing real estate, purchasing automobiles, and other personal loans. The financial products differ depending on the life status of a customer.

Lending institutions offer financial products to customers. The term "customer" refers to any existing customer which has been granted a previous financial product, a customer that has been solicited previously for a financial product, and a potential customer that has not been solicited or is not an existing customer. Financial products such as credit card products are most commonly represented by plastic card-like members that are offered and provided to customers through the lending institution. With a card, an authorized customer (cardholder) is capable of purchasing services and/or merchandise without an immediate, direct exchange of cash. With each purchase, the cardholder incurs debt which the cardholder may thereafter pay upon receipt of a monthly or otherwise periodic statement. In most cases, the cardholder will have the option to either fully pay the outstanding balance or, as a matter of necessity or choice, defer at least a portion or the balance for later payment with accompanying interest or finance charges for the period during which payment of the outstanding debt is deferred.

The spending power of a credit card (i.e., the total amount of funds available to the cardholder at any particular time for making purchases) is typically limited to a particular amount predetermined by the issuer of the card. This amount is commonly referred to as the "credit limit" of the credit card. The size of the issuer-imposed credit limit is generally based on "credit information," including a number of non-exclusive factors, the most important of which are often the customer's earning capacity and the customer's credit history. Credit information is normally collected from one or more credit bureaus.

A problem with current methods and systems for offering financial products to consumers is that they do not take into consideration the customer's life status. The term "life status" refers to a customer's demographic classification relating to life stage and financial standing, for example: high school student, college student, graduate student, employment with salary over $50,000, employment with salary over $100,000, home-owner, head-of-family, retiree, etc. Thus, the term "life status" may refer to the customer's current marital, employment, housing, income, or educational status. As a customer's life status changes, the customer becomes eligible for different financial products. Currently, lending institutions cannot track changes in a customer's life status, and thus cannot revise the financial products appropriate to offer to the customer based on the change in life status.

Another problem with current methods and systems for offering financial products is that credit information is limited to those that have an established credit history. Young adults such as those in high school or college may not have any established credit information. For those with established credit information, the lending institutions may evaluate a "creditworthiness" (referring to the risk associated with lending or making available a credit limit to a customer). However, lending institutions do not currently have the capability to consider a customer's creditworthiness in combination with the life status of the customer to better determine the eligibility of the customer for certain financial products.

Thus, there is a need for a method and system providing financial products based on an evaluation of the customer's life status.

SUMMARY OF THE INVENTION

Systems and methods consistent with the present invention provide financial products throughout the life of a customer. The present invention determines the life status of an identified customer. Certain customer information corresponds to each customer. This customer information describes the life status of the customer. The term "describes" refers to the type of customer information necessary to categorize the customer into a particular life status.

The life status is determined by analyzing the customer information. The term "customer information" refers to information about the customer including information from a variety of sources such as purchase databases, application databases, call center databases, Internet databases, and public records databases. This customer information is used to determine a revised life status for the customer. The term "revised" refers to a indication of a change in life status for a customer, i.e. updated life status for customers who have previously been assigned a life status, and new life status for customers who have not previously been assigned a life status. The determination of life status and selection of financial products for offer is conducted by inputting the customer information into a filter or an algorithmic model to identify appropriate financial products to offer to the customer. In addition, the customer information is used to determine creditworthiness to optimize the financial product offered to the customer or to be used in conjunction with the determined life status. The invention sets forth methods, systems and computers for carrying out this process.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIG. 4 illustrates an exemplary flow chart of an algorithm to determine the whether a customer is a college student; and FIGS. 5A and 5B illustrate an exemplary flow chart of an algorithm to determine the whether a customer has graduated college.

DESCRIPTION OF THE EMBODIMENTS

Preferred embodiments of the present invention will now be described with reference to the accompanying drawings. Wherever possible, the same reference numbers will be used throughout the drawings to refer to the same or like parts.

System and methods consistent with the present invention offer financial products to a customer based on the determined life status of the customer. The system and methods may be used to automate the collection of customer information and offering of financial products over telephones, computers, PDAs, and wireless media. The system and methods receive customer information from a number of sources to determine the life status of a customer. Based on the customer information, the system heuristically determines the customer's life status and then determines an appropriate product to offer the customer based on his or her life status. The system and methods also allow a financial product provider to periodically proactively collect customer information to revise life status and select appropriate financial products to offer the customer from a set of financial products issued by the lending institution.

Figure 1:
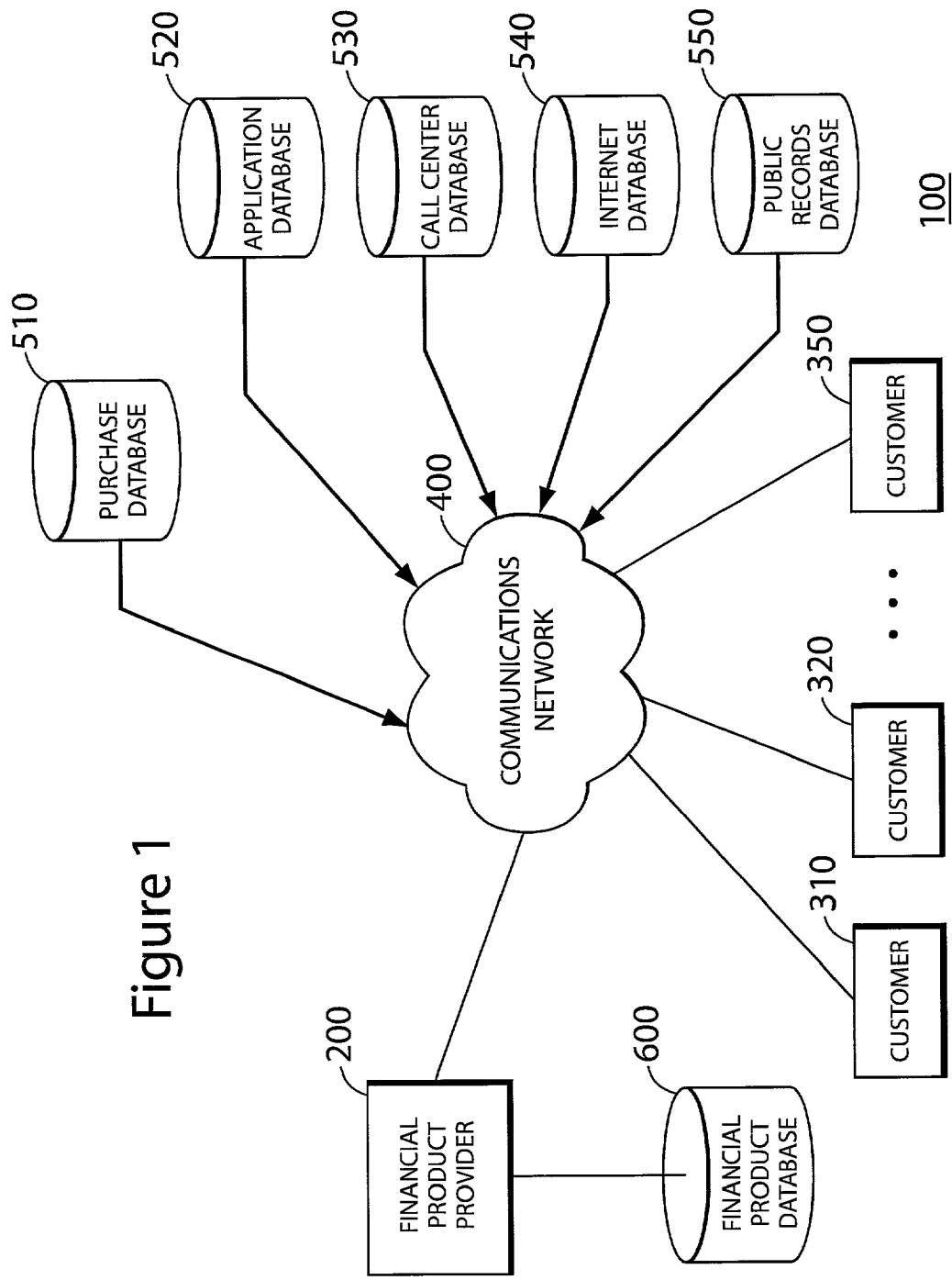
FIG. 1 illustrates an exemplary system environment in which the features of the present invention may be implemented.

By way of a non-limiting example, FIG. 1 illustrates a system environment 100 for implementing the features and principles of the present invention. As illustrated in the block diagram of FIG. 1, a system environment 100 includes a financial product provider 200, a financial product database 600, one or more customers 310-350, and a plurality of customer information databases 510-550 connected to a communications network 400.

While FIG. 1 show that the information databases include purchase database 510, application database 520, call center database 530, Internet database 540, and public records database 550, other types of information databases may also be used. Financial product provider 200 provides the necessary functionality and computing capabilities for analyzing the customer information received from databases 510-550 via communications network 400. Output from the financial product provider 200 includes information concerning an offered financial product including information about optimization of the financial product based on creditworthiness (i.e. credit limit) It sent to one or more customers 310-350 via communication network 400. Output from financial product provider 200 can also be provided to database 600, which may be utilized as a persistent storage device for storing a customer's life status and eligibility for a variety of financial products.

In the embodiment of FIG. 1, financial product provider 200 receives customer information over communications network 400 from at least one of following sources: purchase database 510, application database 520, call center database 530, Internet database 540, and public records database 550. Databases 510-550 may be actual memory databases that are respectively updated with the information from a number of corresponding sources. Alternatively, databases 510-550 may correspond to direct connections to these information sources. Communications network 400 may comprise, alone or in any suitable combination, a telephony-based network (such as a PBX or POTS), a local area network (LAN), a wide area network (WAN), a dedicated intranet, and/or the Internet. Further, any suitable combination of wired and/or wireless components and systems may be incorporated into communications network 400. Financial product provider 200 also communicates to customers 310-350 through the communications network 400, as illustrated in FIG. 1. By using dedicated communication links or a shared network architecture, financial product provider 200 may be located in the same location or at a geographically distant location from databases 510-550 and/or customers 310-350.

Purchase database 510 may contain information about the customer's past purchases. Such information may be collected by the point-of-sale system by tracking purchase transactions over, for example the Visa® or MasterCard® networks. These networks, for instance, include for each transaction a Merchant Category Code (MCC) describing the merchant associated with that transaction. For customers that are not credit card holders, purchase data may be acquired from other entities providing purchasing information on individuals. The purchase database may contain more specific information for lending institutions for which the customer has previously obtained a credit card. Additional information that may be contained in such a case is the amount spent and the place of purchase for each purchase transaction.

Application database 520 may contain information about the customer collected from when the customer responds to credit card offers, to surveys, or to other requests from the financial product provider for information. The type of information that may be collected in such a manner includes the customer's age, income, graduation date, hobbies, choice of credit cards, etc.

Call center database 530 may contain information about the customer collected from when the customer makes inquiries to a customer call center. At this time, the customer may answer questions regarding an application for an offered product, customer relations questions, telemarketing questions, debt collection questions, or questions to authenticate the customer or to avoid fraud. Information collected from the customer in response to such questions may be similar to application data. Further, call center data includes data that may be collected by call center representatives or by automated voice recognition units (VRUs).

Internet database 540 may store information concerning a customer's Internet activity. For example the information collected may concern activity on portals, pages viewed by the customer on a web site, purchases made by the customer through merchant web site, or responses to on-line offers. Internet database 540 may receive this information from an Internet service provider or from a particular web site, such as a general company web site, an e-commerce web site, an on-line services web site, a marketing web site, a commercial banner, or an affiliated web sites.

Public records database 550 may contain information that is publicly available free of charge or purchased from information brokers, such as those that sell mailing lists. Examples of public records databases include American Student Lists® and Acxiom Infobase®. The public records information may include information about birth, marital status, property, children, employment, demographics, credit history, etc.

The databases are exemplary. One skilled in the art understands that many other types of information concerning a customer may be received and processed by a system such as the one described herein. There are many publicly and privately available sources of information that may be collected and used to extract information significant to determining the life status of a customer.

Figure 2:
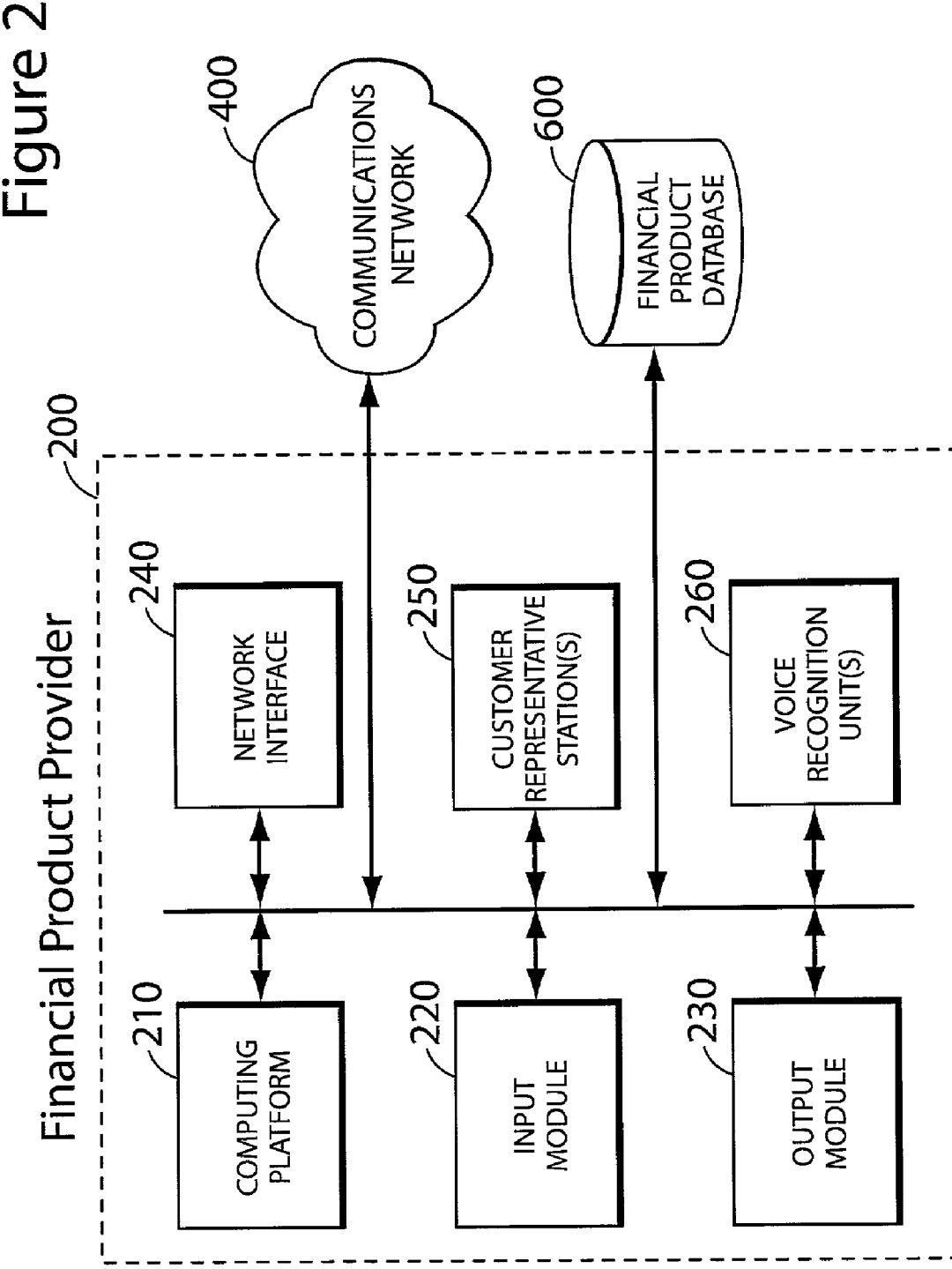
FIG. 2 illustrates an exemplary financial product provider, consistent with the principles of the present invention.

By way of a non-limiting example, FIG. 2 illustrates a financial product provider 200 in which the features and principles of the present invention may be implemented. As illustrated in the block diagram of FIG. 2, a financial product provider 200 includes a computing platform 210, an input module 220, an output module 230, a network interface 240, customer representative station(s) 250, and voice recognition unit(s) 260. Computing platform 210 is adapted to provide the necessary functionality and computing capabilities to analyze the customer information from the communications network 400. Customer information is received from communications network 400 through the communications network interface 240. The communications network interface 240 routes the customer information to the computing platform 210. Information concerning the offered financial product and optimizing information, collectively referred to as the "offer," are provided as output from financial product provider 200 to be communicated to the customers 310-350 through communications network 400 by using output module 230, customer representative stations 250, or voice recognition units 260 routed through the communications network interface 240.

Output module 230 provides the necessary functionality to generate the offer to be routed to communications network interface 240. Customer representative stations 250 may comprise a keyboard, a mouse, a disk drive or any other suitable input device for providing generating the offer to be routed to communications network interface 240. Voice recognition units 260 may comprise a voice recognition unit to generate the offer to be routed to communications network interface 240. Communications network interface 240 receives customer information from the communications network 400 (such as a LAN, WAN, intranet or the Internet) and transmits the offer back. For example, network interface 240 may be connected to Internet data through the communications network 400. The output module 230 may also be used for other purposes, such as internal reports or monitoring and interfacing with database 600.

Computing platform 210 preferably comprises a PC or mainframe computer for performing various functions and operations of the invention. Computing platform 210 may be implemented, for example, by a general purpose computer selectively activated or reconfigured by a computer program stored in the computer, or may be a specially constructed computing platform for carrying out the features and operations of the present invention. Computing platform 210 may also be implemented or provided with a wide variety of components or subsystems including, for example, one or more of the following: one or more central processing units, a co-processor, memory, registers, a data warehouse, and other data processing devices and subsystems.

Alternatively, communication between computing platform 210 and modules 220-260 can be achieved through the use of a network architecture similar to that described above for communications network 400.

Input module 220 of financial product provider 200 may be implemented with a wide variety of devices to receive and/or provide the data as input to computing platform 210. As illustrated in FIG. 2, the input module 220 operates in conjunction with the computing platform 210 and financial product database 600. The input module 220 comprises of functionality necessary to input the filter of algorithmic model necessary for implementing the calculations on computing platform 210 and storing information necessary for implementing the offer in the financial product database 600.

An embodiment of the present invention includes the computing platform 210 accessing a filter stored in the financial product database 600 and accessing customer information from communications network 400 through the communications network interface 240. The filter allows computing platform 210 to assign to each customer a life status based on the received customer information. The filter assigns a life status to customers by categorizing them based upon status criteria uploaded to the financial product provider 200 through input module 220 and stored in financial product database 600. The status criteria describes a particular life status as corresponding to specified customer information. For example, if the customer information defined that the customer has a certain age, purchased a home, and has employment with a salary over $100,000, then the filter would categorize the customer with the life status of home-owner. The filter also contains a predetermined matrix or table which relates each life status type to a particular financial product. Computing platform 210 can determine the appropriate financial products from financial product database 600 for each customer assigned a particular life status. For example, the predetermined matrix would correspond to a mortgage equity service, a refinancing service, and a platinum credit card. The customer information from communications network 400 allows the computing platform 210 to calculate the creditworthiness of the customer, and then store this in the financial product database 600. Further, the predetermined matrix may propose several alternatives for each type of life status. Once the customer's life status has been determined then the array of financial products designated to be offered to the customer may be optimized based on the customer's creditworthiness (found on public records database 550 which contains information from various credit bureaus). The optimization depends on the particular financial product offered to the customer for example, the percentage of available equity is optimized depending on the customer's creditworthiness, the interest rate and points for a refinancing service are optimized depending on the customer's creditworthiness, or the credit limit on a credit card product is optimized depending on the customer's creditworthiness. These financial products are then offered to the customer directly or cross-sold with other services and products across communications network 400.

Another embodiment of the present invention includes inputting customer information from communications network 400 through the network interface 240 into an algorithmic model stored in financial product database 600 and accessed by the computing platform 210 to determine the customer's life status and select a financial product appropriate for the customer. The algorithmic model involves decision-making based on logic operations or mathematical modeling.

Figure 5B:
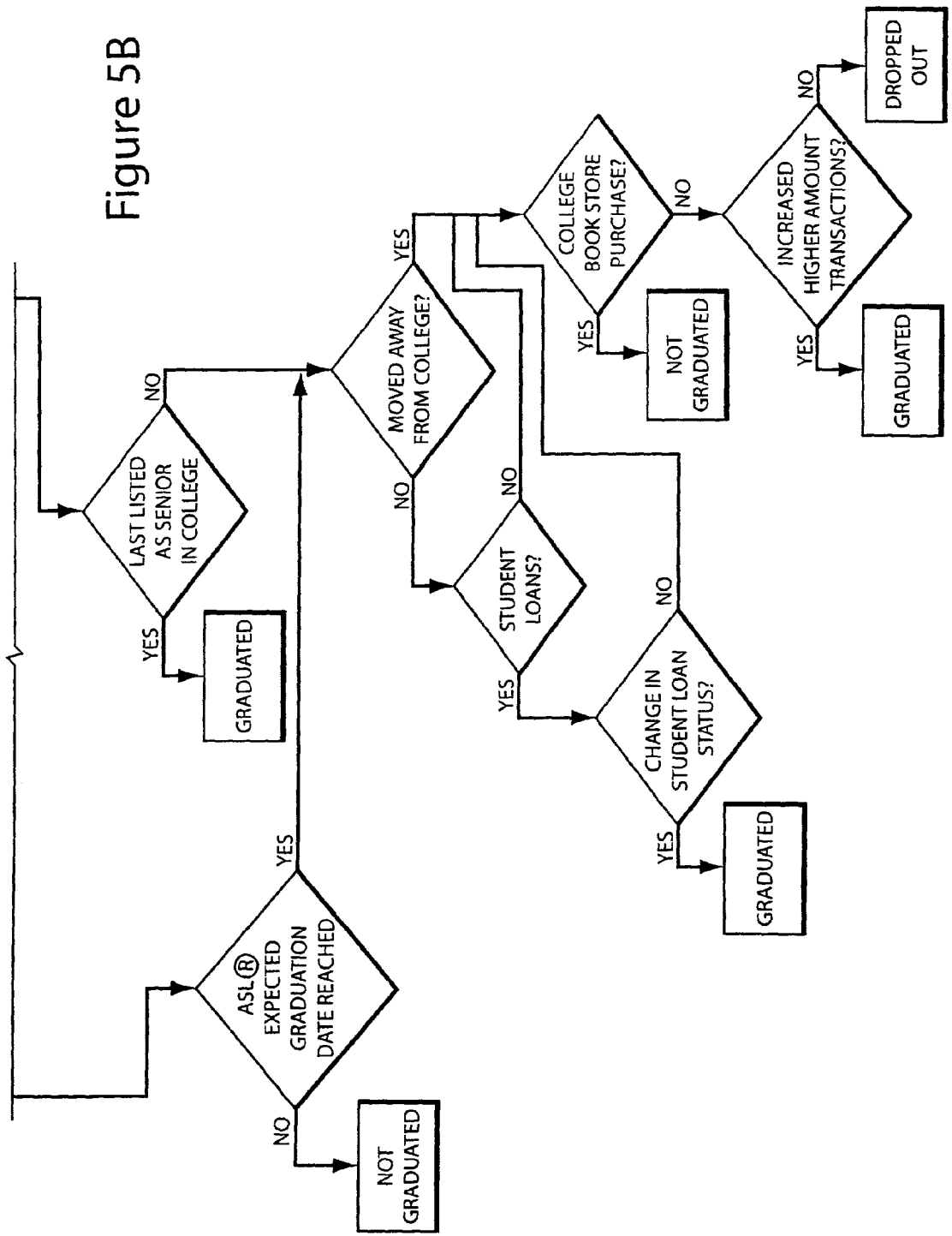

FIG. 4 illustrates an example of a simplified algorithm for determining (called detecting because some young adults do not have a credit history) whether the customer is a college student. When this algorithm determines that the customer taken from a pool of all high school students is in college it assigns that life status to the customer allowing the computing platform 210 to select a financial product in a manner similar to the previous embodiment. FIGS. 5A and 5B illustrate an example of a simplified algorithm for determining (called detecting because some young adults do not have a credit history) whether the customer has graduated college. When this algorithm determines that the customer has graduated college it assigns that life status to the customer allowing the computing platform 210 to select a financial product in a manner similar to the previous embodiment. The algorithms illustrated in FIGS. 4, 5A and 5B use the American Student Lists® ("ASL") which provides whether a customer is on their proprietary list of college students and whether the customers are listed as freshmen, sophomores, juniors, or seniors in college. Other examples of public records that provide the information required for these and other algorithms include Acxiom Infobase® ("Acxiom") services which provide customer information about type of employment, household size, estimated income, home owner/renter; and credit bureaus (such as Experian® ("Experian"), Equifax® and TU®) which provide age of youngest student loan and oldest student loan, and number of educational loans with deferred payment.

Other embodiments for algorithmic models may include determining whether a customer has the life status of a high school student, whether a customer has ever had the life status of college student, whether a customer has the current life status of college student, whether a customer no longer has the life status of college student, whether a customer has the life status of college graduate, whether the customer has the life status of white collar or blue collar worker, and whether a customer has the life status of a student living at home. According to the present invention, the following algorithmic models can be used in the computing platform 210 to determine a particular life status.

An algorithm may determine that a customer has the life status of a high school student if, for example, both the following are true: (1) application database 520 or call center database 530 indicates that the customer was originally solicited while still in high school; and (2) according to the ASL, found in public records database 550, the customer has not reached the designated high school graduation date.

An algorithm may determine that a customer has the life status of a college student if, for example, one of the following are true: (1) application database 520 or call center database 530 indicates that the customer was solicited as a college student; (2) Experian, found in the public records database 550, indicates that customer has a student loan; (3) Acxiom, found in public records database 550 lists the customer as a student; (4) the financial product database 600 indicates that the system has determined that the customer was a student in the previous year; or (5) the application database 520 indicates that the customer identified himself as a student on an application submitted to the lending institution.

An algorithm may determine that a customer has a life status of a college student if, for example, they do not have an active student loan (i.e. one in repayment), as indicated by the public records database 550, and at least one of the following is true: (1) the ASL college list, found in public records database 550, contains the customer's name and financial product database 600 confirms that the system determined that the customer was previously a college student; (2) the call center database 530 indicates that the customer was solicited as a college student within the last academic year; (3) the application database 520 indicates that the customer identified himself as a college student within the last academic year; (4) Experian, found in the public records database 550, indicates that the customer's youngest student loan was taken since previous August; (5) Acxiom, found in the public records database 550, indicates that the customer was previously listed as a college student, living in a single household, and is not listed as being employed; (6) Acxiom, found in the public records database 550, indicates that the customer has not reached the expected graduation date, and purchase database 510 or Internet database 540 do not indicate a reason to remove him from the college student status; (7) Experian, found in the public records database 550, indicates that the customer's oldest student loan is less than 60 months, the customer has not deferred repayment, Acxiom, found in the public records database 550, indicates that the customer has not reached the expected graduation date, and purchase database 510 or Internet database 540 do not indicate a reason to remove him from the college student life status; or (8) Acxiom, found in the public records database 550, indicates the customer was previously listed as being a college student, and purchase database 510 or Internet database 540 do not indicate a reason to remove him from the college student life status.

An algorithm may determine that a customer does not have the life status of a college student if, for example, any of the following are true: (1) any of numbers (1) through five in the previous paragraph are false; (2) Acxiom, found in the public records database 550, indicates that customer is employed and customer living in a single person household; (3) Experian, found in the public records database 550, customer's student loan is active (i.e. in repayment); (4) Experian, found in the public records database 550, the customer's oldest student loan is older than 60 months, and the loan is not deferred; (5) Acxiom, found in the public records database 550, indicates that a year has passed since the customer's expected graduation date, ASL, found in the public records database 550, does not list the customer as a college student, and Experian, found in the public records database 550, indicates that the customer's student loans are not deferred; or (6) Acxiom, found in the public records database 550, indicates that the customer's expected graduation date has passed, and ASL, found in the public records database 550, lists the customer as a college senior.

An algorithm may determine that a customer has the life status of college graduate if, for example the public records database 550 indicates that she is 21 years of age or older, and one of the following are true: (1) Acxiom, found in the public records database 550, indicates that the customer is employed as either tech/professional or admin/manager, and in a household with no one older than 34 years of age; (2) according to ASL, found in the public records database 550, the customer was last listed as a senior or graduate student, and ASL, found in the public records database 550, no longer lists the customer as a college student; or (3) Acxiom, found in the public records database 550, indicates that the customer has left college at her is predicted graduation date.

An algorithm may determine that a customer is given the life status of white collar worker if, for example, the customer is classified by Acxiom, found in the public records database 550, as employed as a professional/technical, clerical/white collar, or administrative/managerial. An algorithm may determine that a customer is given the life status of blue collar worker if, for example the customer is classified by Acxiom, found in the public records database 550, as employed as a sales/service, craftsman/blue collar, farmer, or military. An algorithm may determine that a customer does not have the life status of a student living at home if, for example, Acxiom, found in the public records database 550, lists the oldest person in the household as 34 years of age or younger.

The predetermined matrix and algorithmic model are selection methods for selecting the particular financial product to offer to the customer from a set of financial products. Similar to the predetermined matrix embodiment described above, the algorithmic model embodiment selects certain financial products depending on life status of the customer. Once the customer's life status has been determined then the array of financial products selected by the algorithm to be offered to the customer may be optimized based on the customer's creditworthiness (determined from public records database 550 which contains information from various credit bureaus). The optimization depends on the particular financial product offered to the customer. For example, the percentage of available equity is optimized depending on the customer's creditworthiness, the interest rate and points for a refinancing service are optimized depending on the customer's creditworthiness, or the credit limit on a credit card product is optimized depending on the customer's creditworthiness. These financial products are then offered to the customer directly or cross-sold with other services and products over communications network 400.

The above-noted features and other aspects and principles of the present invention may be implemented in various system or network environments to provide automated computational tools to facilitate data collection, risk analysis, and credit limit assignment. Such environments and applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by any suitable combination of hardware, software, and/or firmware including a computer comprising of memory having program instructions and a processor, responsive to the programming instructions, configured to carry out the operations of the invention. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. Examples of program instructions include both machine code, such as produced by compiler, and files containing a high level code that can be executed by the computer using an interpreter.

In accordance with the principles of the present invention, an exemplary method for providing financial products will now be described with reference to FIG. 3.

Figure 3:
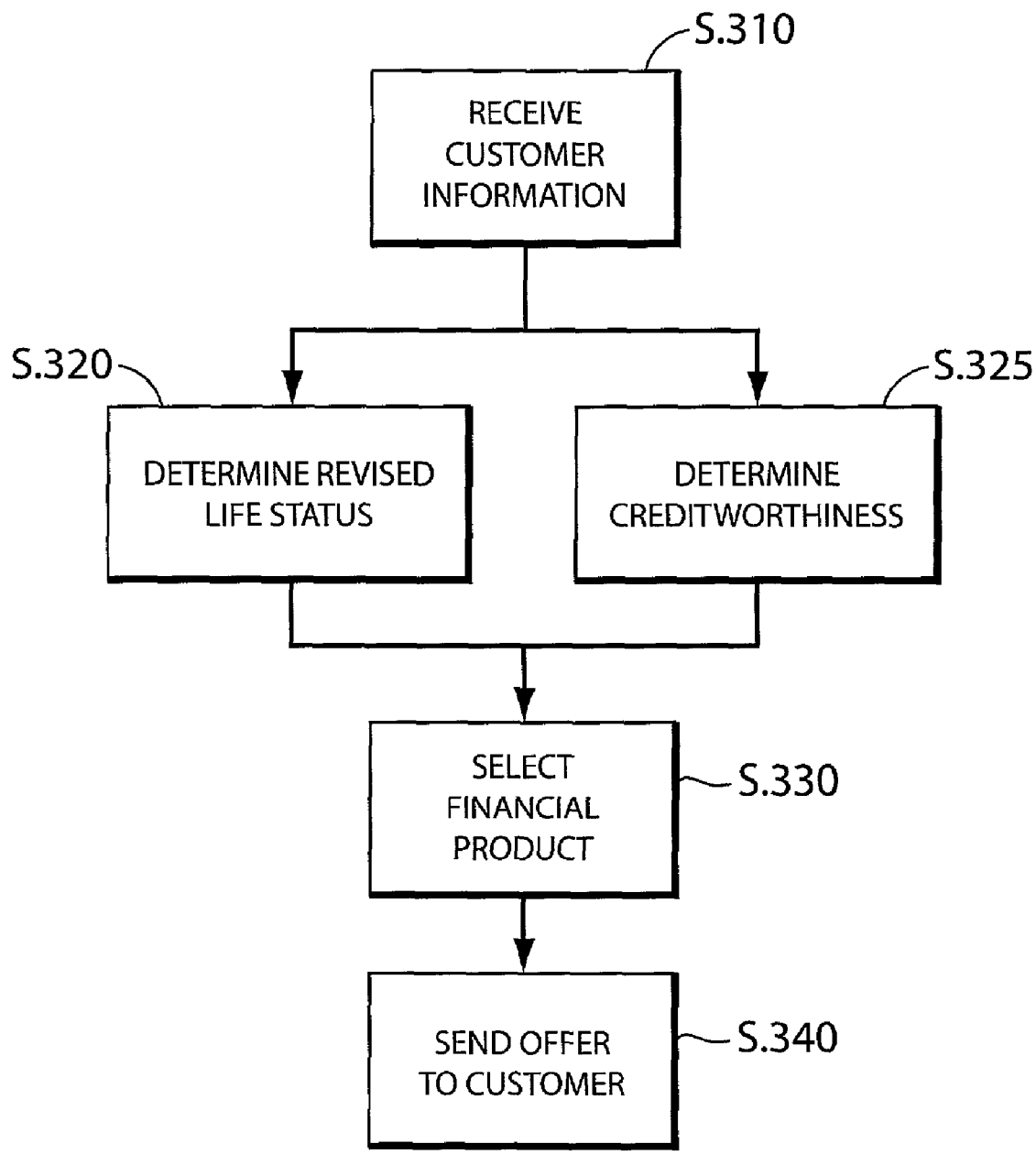
FIG. 3 illustrates an exemplary method for providing financial products, consistent with the principles of the present invention.

FIG. 3 is an exemplary flowchart of a method for providing financial products to customers. As illustrated in FIG. 3, the financial product provider receives customer information (Step S.310) from customer information databases 510-550 and financial product database 600 concerning customers 310-350. The correlating of the customer information and financial product database information is done through communications network 400 and financial product provider 200. Financial product provider 200 recalls customers which have been previously solicited from financial product database 600. The financial product provider 200 then determines the status of the customer (step S.320) and determines the creditworthiness of each customer (step S.325) either in serial or in parallel (as shown). The financial product provider 200 evaluates the creditworthiness of customers by analyzing the information from credit bureaus resident on public records database 550. The financial product provider 200 determines the life status of the customer (updating the life status of customers previously solicited and assigning life status to customers not previously solicited) by utilizing the filter or algorithm in computing platform 210. The financial product provider 200 then selects which financial product from a set of financial products to offer to the customer using at least one selection method chosen from a predetermined matrix and an algorithmic model. The selection by computing platform 210 is based on the life status of the customer and the customer's creditworthiness (Step S.330). Alternatively, the life status of the customer is used in selecting the financial product and the customer's creditworthiness (determined from public records database 550 which contains information from various credit bureaus) is used to optimize the financial product selected by computing platform 210. The optimization depends on the particular financial product offered to the customer for example, the percentage of available equity is optimized depending on the customer's creditworthiness, the interest rate and points for a refinancing service are optimized depending on the customer's creditworthiness, or the credit limit on a credit card product is optimized depending on the customer's creditworthiness. The financial product provider 200 then sends the offer to the customer (Step S.340) through either the output module 230, the customer a representative station 250, or voice recognition unit 260 through communication network 400.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing a financial product to a customer, said method comprising:
   receiving customer information from at least one source chosen from a purchase database, an application database, a call center database, an Internet database, and a public records database;
   analyzing the received customer information using a filter that categorizes a customer into a life status, wherein the life status corresponds to the customer's demographic classification;
   selecting, from a set of financial products, a first financial product for the customer based on said life status using a data structure that relates each life status type to a particular financial product;
   monitoring, periodically, the customer information for changes;
   automatically revising, based on a change to the customer information, the customer's life status;
   selecting, from the set of financial products, a second financial product for the customer based on said revised life status using the data structure that relates each life status type to a particular financial product;
   determining the creditworthiness of the customer; and
   optimizing said first and second financial products based on said creditworthiness.

2. A method for providing a financial product to a customer according to claim 1, further comprising:
   offering said first and second financial products to said customer.

3. A method for providing a financial product to a customer according to claim 1, wherein selecting said first and second financial products further comprises:
   including the customer's creditworthiness as a factor in the selection of said first and second financial products.

4. A method for providing a financial product to a customer according to claim 1, further comprising:
   periodically receiving said customer information.

5. A method for providing a financial product to a customer according to claim 1, wherein the data structure comprises a matrix or algorithm.

6. A computer for providing a financial product to a customer, said computer comprising:
  a memory having program instructions; and
  a processor, responsive to the programming instructions, configured to:
  receive customer information from at least one source chosen from a purchase database, an application database, a call center database, an Internet database, and a public records database;
  analyze the received customer information using a filter that categorizes a customer into a life status, wherein the life status corresponds to the customer's demographic classification;
  select, from a set of financial products, a first financial product for the customer based on said life status using a data structure that relates each life status type to a particular financial product;
  monitor, periodically, the customer information for changes;
  automatically revise, based on changes to the customer information, the customer's life status; and
  select, from the set of financial products, a second financial product for the customer based on said revised life status using the data structure that relates each life status type to a particular financial product;
  determine the creditworthiness of the customer; and
  optimize said first and second financial products based on said creditworthiness.

7. A computer for providing a financial product to a customer according to claim 6, wherein said processor is further configured to:
  offer said first and second financial products to said customer.

8. A computer for providing a financial product to a customer according to claim 6, wherein the data structure comprises a matrix or algorithm.

* * * * *